April 18, 1950          D. TABIN          2,504,359
ANIMAL TRAP
Filed Aug. 13, 1948
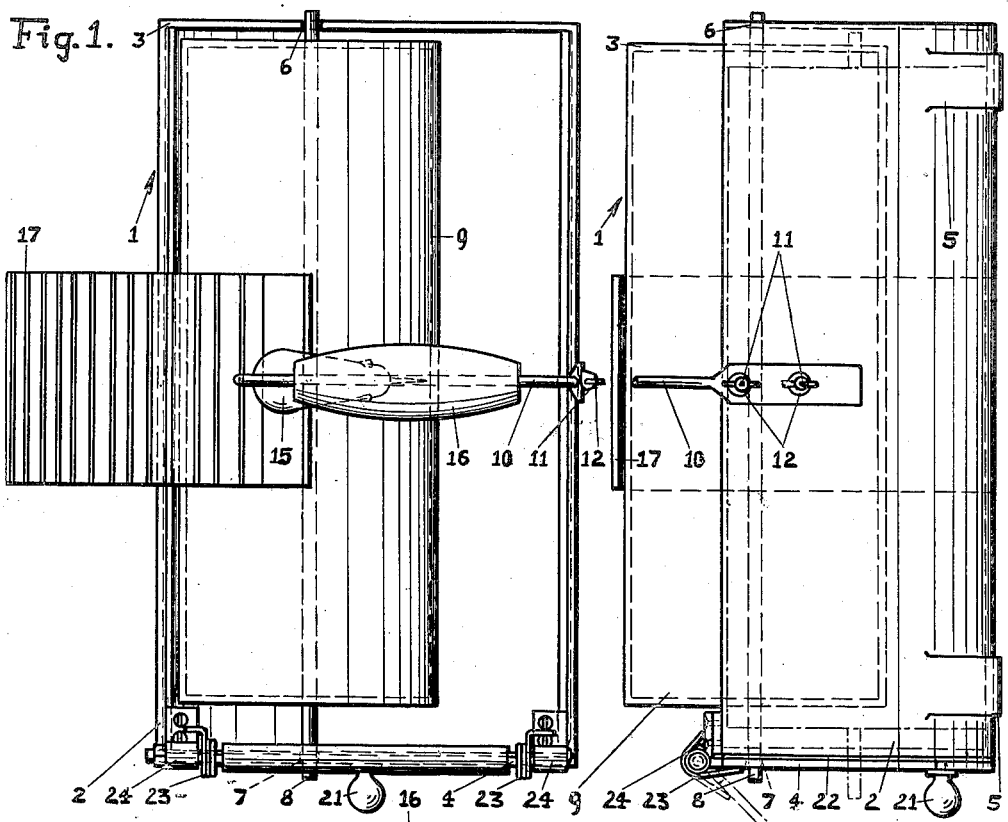
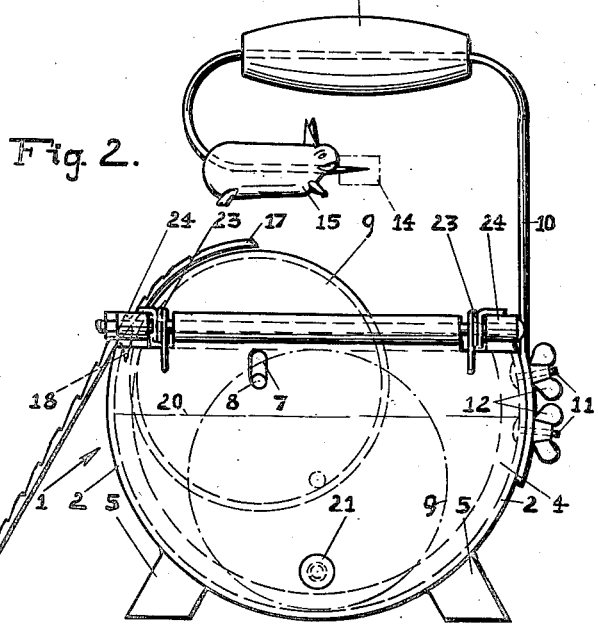
INVENTOR.
David Tabin Patented Apr. 18, 1950

2,504,359

UNITED STATES PATENT OFFICE 2,504,359

ANIMAL TRAP

David Tabin, Freeport, N. Y.

Application August 13, 1948, Serial No. 44,061

1 Claim. (Cl. 43—64)

This invention relates to a trap for catching mice, rats and other similar animals, and has for the primary object the provision of a device of this character wherein the animals will be trapped and drowned, and may be easily, without necessarily touching them or even seeing them, removed as desired.

Another object of the present invention is to provide a trap into which animals are readily enticed and therein drowned, the trap being highly sanitary, safe, and efficient in operation.

One of the further important objects of this invention is to provide an improved trap which shall be more nearly escape-proof than the ordinary trap, and which will not be likely to be inadvertently moved without trapping the animal, and more capable of trapping the animal that is wary of actually entering traps.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings:

Figure 1 is a top plan view of a preferred embodiment of my invention;

Fig. 2 is a front view of the same; and

Fig. 3 is a side view of the same.

Similar reference characters refer to similar parts throughout the several views.

In the drawing the numeral 1 denotes a trough or an open receptacle adapted to contain a liquid, such as water, and being made of plastic material, rust-proof metal, or of any other suitable, inexpensive material. It has longitudinal wall portions 2 and end walls 3 and 4, at least one of the latter, the end wall 4 in the present instance, being tiltable relative to the wall portions 2. The trough 1 is supported by feet 5 or the like, which preferably are formed as units with the wall portions 2. Opposite upper portions of the end walls 3 and 4 are provided with slots 6 and 7, in which the ends of an axis 8 are rotatable. The latter is extended through a cylinder 9, which extends through the major portion of the trough 1 and is in spaced relation to the upper edges of the trough 1. Preferably there is a particularly large distance between the cylinder 9 and the right hand edge (Fig. 2) of the trough 1, as in the instance shown, and a portion of the cylinder 9 protrudes above the trough 1. A rod 10 is removably attached to the outer side of the trough 1, preferably by means of screws 11 and wing nuts 12, and extends vertically therefrom to a point at which it is bent right-angularly, so that its horizontal portion extends over said cylinder, and the end portion of the rod is bent back beneath its horizontal portion and has a pointed extremity adapted for attaching thereto a bait 14 (Fig. 2). An animal figure 15 is secured to the end portion of the rod 10, preferably by extending a portion of the rod therethrough; and a handle 16 is secured to the upper horizontal portion of the rod 10 in order to facilitate the carrying of the trap.

An oblique plate 17 having a rough upper surface is attached to an upper edge portion of said trough 1 by means of a hook 18 (Fig. 2) or the like formed as a unit with, or attached to, the lower side of the plate 17, opposite the rod 10 and has its upper end portion extended half-way over said cylinder, while its lower extremity rests upon the ground on which said container stands; this plate 17 is for facilitating the access of an animal to the bait 14. The figure 15 is an imitation of an animal nibbling at the bait 14, so that an animal will be attracted to the bait and enticed to climb upon the plate 17, not only by the smell of the bait but also by the optical delusion making it appear as if another animal were safely eating from the bait. The upper extremity of the plate 17 is preferably curved in conformity to the cylinder 9 and extends to the vertical center of the cylinder 9. An animal, in his attempt to reach the bait 14, will step upon the cylinder 9 from the plate 17, and the cylinder 9 will, due to the weight of the animal resting upon it beyond its center of gravity, rotate in a clockwise direction, so that the animal will be drowned in the liquid contained in the trough 1 up to a level indicated by the line 20 in Fig. 2.

After the drowning of one animal the trap immediately is ready for the next victim. In order to empty the trap into a sewer or the like, the end wall 4 is lifted, by pulling the handle 21, so that the water together with the dead animals may be removed from the trap without touching the dead animals. If the trap is being held with one hand gripping the handle 16, while the end wall 4 is being lifted with the other hand, the dead animals are hardly visible to the operator while he or she is emptying the trap. After releasing the open end wall 4, the latter will be pressed against the washer 22 interposed between the vertical edges of the wall portions 2 and the end wall 4 by the force of springs 23 which are arranged at the hinges 24.

If the trap is not to be used for a longer period of time, or while it is being shipped and stored, its size can be reduced to a minimum due to the following features of collapsibility: Upon tilting the end wall 4 so far as is indicated in Fig. 3 by dash-and-dotted lines, one end of the cylinder axis 8 will slip out of the slot 7, and the other end of the axis 8 can be removed easily from the slot 6 in the wall 3, so that the cylinder 9 can be placed at the bottom of the trough 1, as is indicated by dash and dotted lines in Figs. 2 and 3. Thus the cylinder 9 no longer will protrude beyond the upper edge of the trough 1. Moreover, the rod 10 can be removed after loosening the screws 11, so that it can be placed alongside the trough 1, thus requiring but very little space in a package or storage compartment.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which as a matter of language might be said to fall therebetween.

Having thus fully described my said invention, what I claim as new and desire to secure by Letters Patent in the United States is:

A device of the character described comprising an open liquid container having a side wall constituting a bottom, and opposite end walls, said end walls defining bearing slots, one of said end walls being swingable and provided with resilient means for forcing it against the adjoining side wall to maintain it closed, a horizontal cylinder, closed at both ends, and having an axle whose end portions are rotatably mounted in said bearing slots, a rod attached to the outer side of said container and being upwardly extended therefrom, said rod having a horizontal extension on the upper end thereof, the free end of said extension being provided with a point located above said cylinder and adapted to receive a bait, an animal figure secured to the free end of said extension, and a removable, upwardly inclined, plate, having a rough upper surface, said plate being attached to an upper edge portion of said side wall, and having an end portion extended over said cylinder and the opposite end adapted to rest upon the supporting surface for said container.

DAVID TABIN.

REFERENCES CITED

The following references are of record in the file of this patent:

UNITED STATES PATENTS

| Number | Name | Date |
|---|---|---|
| 1,630,123 | Kesel et al. | May 24, 1927 |

FOREIGN PATENTS

| Number | Country | Date |
|---|---|---|
| 22,007 | Great Britain | of 1903 |